United States Patent [19]

Kusama et al.

[11] Patent Number: 4,529,979

[45] Date of Patent: Jul. 16, 1985

[54] REMOTE RETURN LOOP CONTROL IN A DATA TRANSMISSION SYSTEM

[75] Inventors: Takeo Kusama, Chigasaki; Hisasi Kiyonaga, Hadano, both of Japan

[73] Assignee: Hitachi, Ltd., Tokyo, Japan

[21] Appl. No.: 397,972

[22] Filed: Jul. 14, 1982

[30] Foreign Application Priority Data

Sep. 7, 1981 [JP] Japan ................... 56-139718

[51] Int. Cl.³ .................. H04M 11/00; H04Q 9/00
[52] U.S. Cl. ................ 340/825.05; 370/15; 179/175.3 R; 375/10
[58] Field of Search ............. 340/825.05, 825.01; 179/175.31 R; 375/10; 371/22, 25, 27; 370/14, 15

[56] References Cited

U.S. PATENT DOCUMENTS 3,743,938 7/1973 Davis .................... 370/15
4,064,459 12/1977 Markwitz et al. ............ 375/10
4,271,513 6/1981 Maejima et al. ............. 370/15
4,402,075 8/1983 Bargeton ................... 370/15
4,425,662 1/1984 Jeandot .................... 375/10

Primary Examiner—Donald J. Yusko
Attorney, Agent, or Firm—Antonelli, Terry & Wands

[57] ABSTRACT

In a return loop control system in a data transmission system having data transmission units such as modems connected at opposite ends of a transmission line, a return loop being formed at one of the data transmission units by a command signal from the other data transmission unit when the transmission line, modulator, demodulator, etc. are to be tested. Where a data to be transmitted is sent out a predetermined time period later than the send-out of a signal for establishing a communication status to the transmission line, a command signal for forming a return loop is sent out within the predetermined time period.

3 Claims, 5 Drawing Figures

| SLAVE MODEM DEVICE NUMBER | RETURN LOOP COMMAND SIGNAL (LS) | | |
|---|---|---|---|
| | RETURN LOOP INSTRUCTION BIT | SLAVE MODEM DESIGNATION BIT | |
| 1 | 0 | 0 | 0 |
| 2 | 0 | 0 | 1 |
| 3 | 0 | 1 | 0 |
| 4 | 0 | 1 | 1 |

REMOTE RETURN LOOP CONTROL IN A DATA TRANSMISSION SYSTEM

BACKGROUND OF THE INVENTION

1. Field of the Invention

The present invention relates to a remote return loop control system in a data transmission system having data transmission units such as data modulators/demodulators (hereinafter referred to as modems) connected at opposite ends of a transmission line, in which a return loop is formed at the remote data transmission unit by a command from the other data transmission unit when the transmission line, modulator, demodulator, etc. are to be tested.

2. Description of the Prior Art

A prior art remote return loop control system of this type usually uses a signal in a frequency range beyond the frequency band used for the modem or a predetermined combination of code sequences as a loop command signal. The former method, however, needs accurate oscillator and band-pass filters and hence has an economic problem. In addition, when the transmission rate is low, the frequency band of the modem is wide and hence it is difficult to transmit the loop command signal. In the latter method, if code sequences which are identical to those of the loop command signal occur during normal data transmission, they may be detected as the loop command signal and the return loop may be formed. Therefore, restriction is imposed on the degree of freedom in the code of data the transmission of which is desired.

SUMMARY OF THE INVENTION

It is an object of the present invention to provide a remote return loop control system which overcomes the above problems encountered in the prior art system.

According to the present invention, in a data transmission system which sends out data a predetermined time after a data transmission unit has sent out a signal for establishing a communication status to a transmission line, a loop command signal is sent out to the transmission line within the predetermined time to form a return loop at a remote data transmission unit.

DESCRIPTION OF THE PREFERRED EMBODIMENTS

In the following description, an embodiment which uses modems as the data transmission units is explained although the present invention is applicable to a system which uses data transmission units other than modems.

Figure 1:
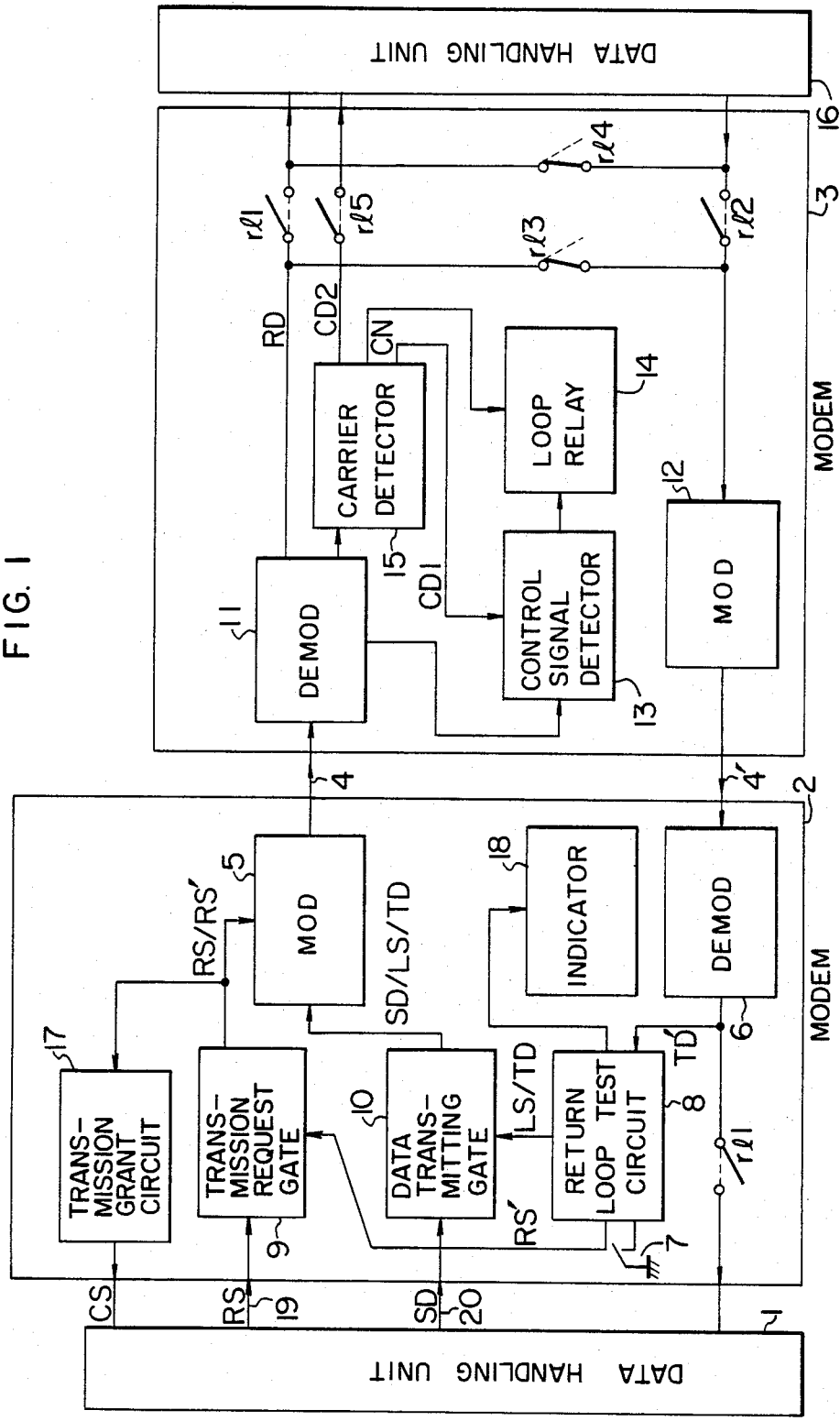
FIG. 1 shows a block diagram of a data transmission system in accordance with one embodiment of the present invention.

FIG. 1 shows a block diagram of a data transmission system in accordance with one embodiment of the present invention. In FIG. 1, numerals 2 and 3 denote modems which are respectively connected to data handling units 1 and 16, such as communication control units or terminal devices. The modems 2 and 3 are interconnected via a set of transmission lines 4 and 4'. The transmission lines 4 and 4' transmit data from the modem 2 to the modem 3 and from the modem 3 to the modem 2, respectively.

The modems 2 and 3 may be of the same construction. Only those elements of the modems which are necessary for the explanation are shown and those elements which are common to both modems and not necessary for the explanation are omitted in the drawing.

The system of FIG. 1 operates in the following manner. A normal data transmission mode will be first explained.

When data is to be transmitted from the data handling unit 1 to the data handling unit 16, the data handling unit 1 sends out a transmission request signal RS requesting the transmission to the modem 2. The transmission request signal RS is supplied to a modulator 5 through a transmission request signal gate 9 to cause the modulator 5 to initiate the send-out of a carrier CR to the transmission line 4. The carrier CR serves as a signal to establish a communication status. When a time period T1 has elapsed since the rise of the transmission request signal RS, a transmission grant circuit 17 sends out a transmission grant signal CS to the data handling unit 1 to inform to the data handling unit 1 of the establishment of the data communication status. Under this status, the data handling unit 1 is permitted to transmit the data. Thereafter, transmitting data SD from the data handling unit 1 is supplied to the modulator 5 through a data transmitting gate 10 and modulates the carrier CR. The modulated carrier is sent out from the modulator 5 to the transmission line 4 as a modulated data signal.

On the other hand, in the modem 3, when the carrier CR is transmitted over the transmission line 4, a demodulator 11 carries out a synchronous pulling operation to prepare for the data reception. A carrier detector 15 sends out a carrier detection signal (CD2) to the data handling unit 16 a time T2 after the detection of the carrier CR to inform to the data handling unit 16 of the establishment of the data communication status. Usually, $T1 \geq T2$ and those time periods are selected to be long enough for the modems 2 and 3 to establish the data communication status.

In the normal data communication mode, a loop relay 14 is in an off position and contacts $\gamma l_1$ to $\gamma l_5$ thereof are in positions shown by broken lines. The modulated data signal sent out from the modem 2 to the transmission line 4 is demodulated by the demodulator 11 and an output thereof or a received data (RD) is supplied to the data handling unit 16 through the contact $\gamma l_1$.

The data transmission from the data handling unit 1 to the data handling unit 16 has been described so far. The data transmission in the opposite direction is carried out in a similar way. After the establishment of the data communication status, data transmitted from the data handling unit 16 is sent out to the transmission line 4 through the contact $\gamma l_2$ of the modem 3 and a modulator 12 and supplied to the data handling unit 1 through a demodulator 6 of the modem 2 and the contact $\gamma l_1$.

Figure 2:
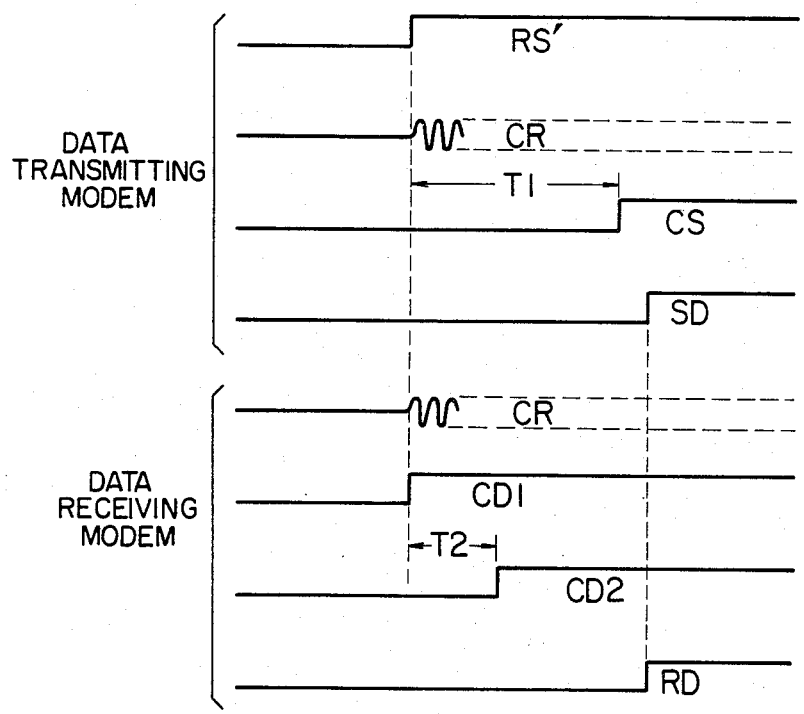
FIG. 2 shows a timing chart for a normal transmission mode in FIG. 1.

Most of the elements described so far are well known. A timing chart for the above operations is shown in FIG. 2.

A remote return loop test operation will now be explained. It is assumed that the modem 2 is a control site and the modem 3 is a controlled site and a return loop is to be formed at the modem 3.

When a return loop test switch 7 in the modem 2 is turned on, a transmission request signal RS' is supplied from a return loop test circuit 8 to the transmission request signal gate 9 after a predetermined time delay. The transmission request signal gate 9 supplies the transmission request signal RS' to the modulator 5 to cause the modulator 5 to initiate the send-out of the carrier CR.

In a system in which the transmission request signal RS is sent out from the data handling unit 1 in the remote return loop test mode, the transmission request signal gate 9 blocks the transmission request signal RS from the data handling unit 1 so that only the transmission request signal RS' from the return loop test circuit 8 is sent out.

When the time period T1 has elapsed since the rise of the transmission request signal RS', the transmission grant signal CS is issued but the data handling unit 1 ignores the signal CS. The return loop test circuit 8 issues a return loop command signal LS a predetermined time TO later within the time period T1 and the signal LS is sent out to the transmission line 4 through the transmitting data gate 10 and the modulator 5. After the time period T1 has elapsed, the return loop test circuit 8 supplies test data TD consisting of a series of bits to the modulator 5 as the transmitting data through the data transmitting gate 10 so that the modulated data signal is sent out to the transmission line 4.

When the data is not sent out from the data transmitting gate 10, the modulator 5 usually sends out a series of "1". Accordingly, a single "0" bit which is distinct from the series of "1" may be used as the return loop command signal LS.

On the other hand, when the carrier CR is detected by the carrier detector 15 in the modem 3, the carrier detector 15 supplies a carrier detection signal CD1 to a control signal detector 13. Thus, the control signal detector 13 monitors for a predetermined time period if the return loop command signal LS is detected in the output of the demodulator 11. If it is detected, the loop relay 14 is energized to change the positions of the contacts $\gamma l_1$ to $\gamma l_5$ to solid line positions.

Accordingly, the test data TD subsequently received from the transmission line 4 is returned to the transmission line 4' through the demodulator 11, the contact $\gamma l_3$ and the modulator 12.

The carrier detector 15 produces the carrier detection signal (CD2) the time period T2 later than the detection of the carrier CR but it is not sent out after the return loop command signal LS has been detected because the contact $\gamma l_5$ is turned off.

In the modem 2, the modulated data signal returned from the modem 3 and sent out to the transmission line 4' is demodulated by the demodulator 6 in the same manner as the modem 3 and the test data TD' therefrom is supplied to the return loop test circuit 8. The return loop test circuit 8 compares the test data TD supplied to the modulator 5 with the test data TD' received from the demodulator 6 so that the compare result is indicated by an indicator 18.

In this state, if there exists data to be sent out from the data handling unit 16 to the modem 3, it is returned to the data handling unit 16 through the contact $\gamma l_4$.

Figure 3:
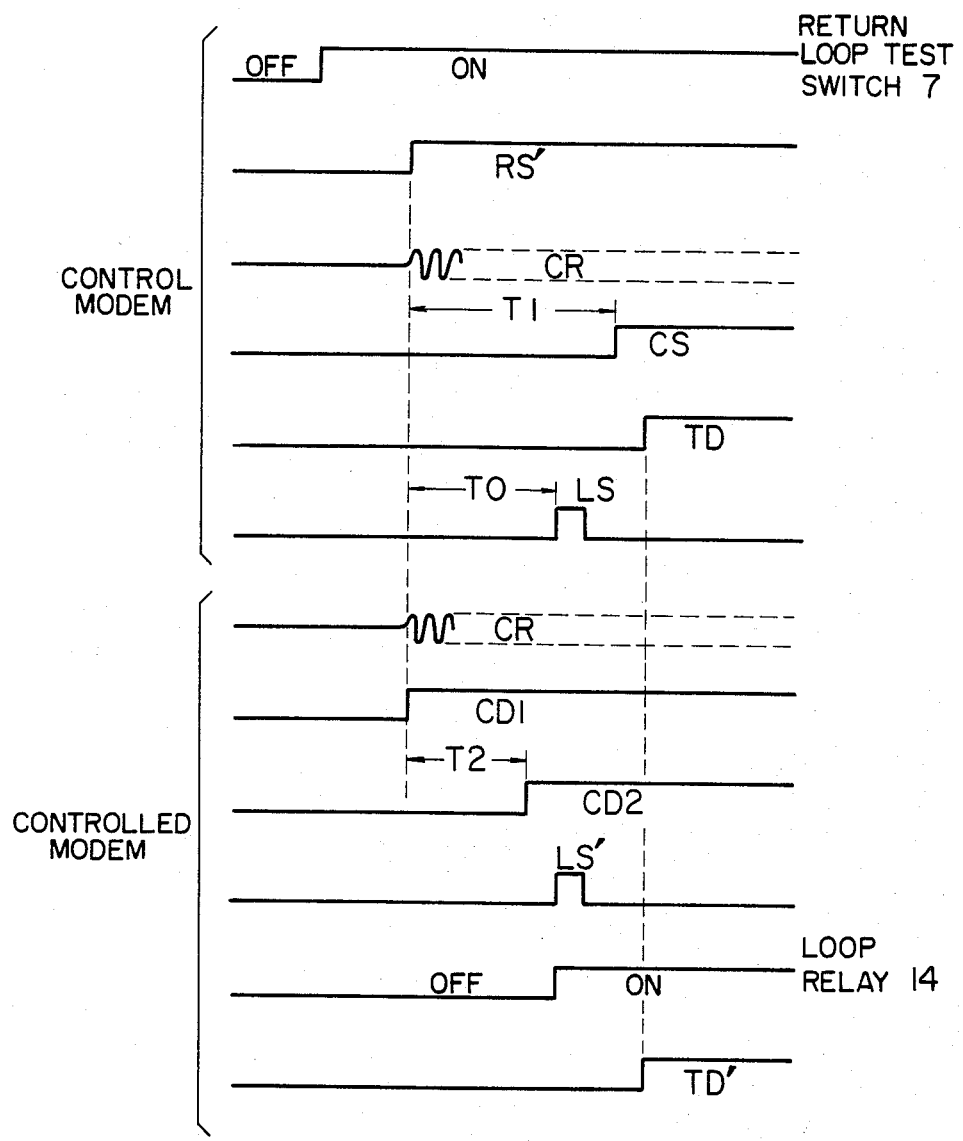
FIG. 3 shows a timing chart for forming a return loop in FIG. 1.

A timing chart for the above operations is shown in FIG. 3.

The end operation of the remote return loop test will now be explained in conjunction with the release of the return loop formed at the modem 3.

In the modem 2, when the return loop test switch 7 is turned off, the return loop test circuit 8 suppresses the transmission request signal RS' from the transmission request signal gate 9. As a result, the modulator 5 stops the transmission of the carrier CR to the transmission line 4.

In the remote return loop test, if the data handling unit 1 sends out the transmission request signal RS, the transmission request signal RS exists when the transmission request signal RS' terminates. In this case, the transmission request signal gate 9 sends out the transmission request signal RS to the modulator 5 at least a time period T3 later than the termination of the transmission request signal RS'. Thereafter, the data communication mode is established.

On the other hand, in the modem 3, if the carrier detector 15 continuously detects the absence of the carrier CR for the time period T3, it produces a carrier off signal CN. The carrier off signal CN causes the loop relay 14 to be deenergized so that the positions of the contacts $\gamma l_1$ to $\gamma l_5$ change to the broken line position. Thus, the return loop at the modem 3 is released. A timing chart for the above operations is shown in FIG. 4.

Figures 4, 5:
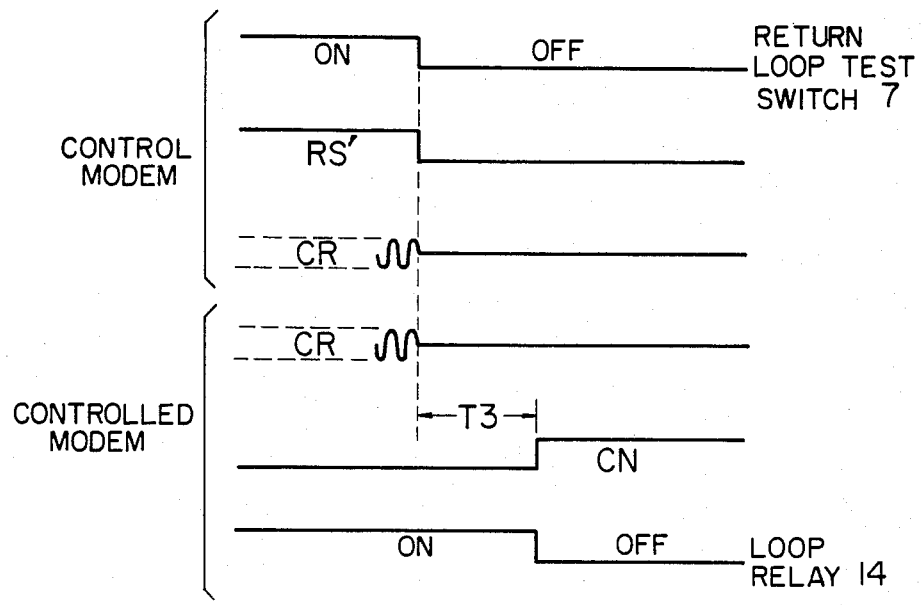
FIG. 4 shows a timing chart for releasing the return loop in FIG. 1.
FIG. 5 shows a diagram of one example of a return loop command signal in the present invention.

It should be noted that delay of signal propagation in the transmission line(s) is ignored in the timing charts illustrated in FIGS. 2, 3 and 4.

While one preferred embodiment of the present invention has been described, it should be understood that the present invention is not limited to the specific embodiment but many other modifications may be made.

For example, in a system in which one of the modems always acts as a control site and the other modem always acts as a controlled site in the return loop test, the control modem need not include the loop relay and the controlled modem need not include the return loop test switch 7, the return loop test circuit 8 and the indicator 18. Thus, both modems need not always be constructed identically.

While the return loop test switch 7, the return loop test circuit 8 and the indicator 18 are provided in the modem in the illustrated embodiment, they may be provided in a separate test unit. Alternatively, the return loop test switch 7, the return loop test circuit 8 and the indicator 18 may be provided in the data handling unit.

When the return loop test switch 7, the return loop test circuit 8 and the indicator 18 are provided in a separate test unit or the data handling unit, the transmission request signal RS' may be supplied to the modem through the signal line 19 and the return loop command signal LS and the test data TD may be supplied to the modem through the signal line 20.

While the modems are interconnected in a duplex mode one to one in the illustrated embodiment, one modem (called a master modem) may be interconnected in the duplex mode with a plurality of modems (called slave modems) through a branch unit. In this case, the return loop command signal LS sent out from the main modem includes information signals to designate one of the slave modems.

For example, when four slave modems are connected, the return loop command signal LS may comprise three bits as shown in FIG. 5 with the first bit ("0" bit) instructing the return loop and the following two bits designating one of the modems. In each slave modem, the return loop is formed in response to the receipt of the corresponding return loop instruction.

While the relay 14 is used to form the loop in the modem in the illustrated embodiment, other electronic switch device may be used.

In accordance with the present invention, the remote return loop system for the modem or the like can be attained only by the digital logic circuits with a low cost and the return loop command signal is transmitted in a time frame which is completely distinguished from that of the normal data. Accordingly, even if the same pattern as that of the return loop command signal occurs in the normal data code, there is no risk that an undesired loop return is erroneously formed.

We claim:

1. A data transmission system comprising:
    first and second data transmission means each having modulator means for modulating a carrier by data supplied thereto and demodulator means for demodulating data from a modulated carrier;
    a first transmission line connected between said first and second data transmission means for transmitting a signal from the modulator means of said first data transmission means to the demodulator means of said second data transmission means;
    a second transmission line connected between said first and second data transmission means for transmitting a signal from the modulator means of said second data transmission means to the demodulator means of said first data transmission means;
    the modulator means of said first data transmission means including means for sending out a carrier signal carrying no data on said first transmission line during a first predetermined time period and for sending out a carrier signal carrying data to be transmitted on said first transmission line only after the elapse of said first predetermined time period following the start of the send-out of said carrier carrying no data, and means for selectively modulating said carrier signal with a loop command requesting the formation of a return loop in said second data transmission means and for sending out said loop command modulated carrier signal on said first transmission line during said first predetermined time period; and
    said second data transmission means including first means for detecting receipt of a carrier signal transmitted through said first transmission line, second means for monitoring whether or not said received carrier signal is modulated with a loop command only during a second predetermined time period following the detection of the carrier signal by said first means, and third means for supplying to the modulator means of said second data transmission means through a return loop data which is obtained from the demodulator means of said second data transmission means after said loop command is detected by said second means.

2. A data transmission system according to claim 1, wherein said loop command includes binary signal having a first signal portion at one level for only a known time period within a signal portion at the other level which is otherwise maintained continuously.

3. A data transmission system according to claim 1, further including means for supplying the modulator means of said first data transmission means after said loop command modulated carrier signal is supplied to said first transmission line so that said test data will be transmitted to said second data transmission means on said first transmission line and returned to said first data transmission means via said return loop and said second transmission line.

* * * * *